UNITED STATES PATENT OFFICE 2,691,055

RUBBER HYDROCHLORIDE FILM

Warren C. McVey, Wadsworth, Ohio, assignor, by mesne assignments, to The Goodyear Tire & Rubber Company, a corporation of Ohio No Drawing. Application July 19, 1951,
Serial No. 237,677

1 Claim. (Cl. 260—735)

This invention relates to an improved rubber hydrochloride film. The film is plasticized. It contains wax which serves as a moisture-proofing ingredient, and the wax is used in excess of the amount soluble in the film. To prevent the excess wax from blooming to the surface or otherwise interfering with the clear transparency of the film, the film includes a material which renders the wax compatible with the plasticized rubber hydrochloride. This film is not only highly moisture proof, but it is clearly transparent and free from bloom, and it possesses the desirable physical properties associated with plasticized film.

Rubber hydrochloride film is prepared by casting a benzene solution of the film material on a suitable surface, such as an endless belt or the like. The solvent is then evaporated, leaving a film of the rubber hydrochloride on the surface. Films of various thicknesses are prepared ranging from perhaps .0008 to .0025 inch or thereabout.

Unplasticized rubber hydrochloride film is highly moistureproof but is somewhat stiff for packaging, and its tear strength is not as great as is generally desired. Various plasticizers have been added to the film to make it more flexible and increase its tear strength and to otherwise improve its physical properties. The most satisfactory plasticizers are esters, and include, for example, the following materials: butyl stearate, dibutyl sebacate, dioctyl sebacate, di-n-decyl adipate, trioctyl phosphate, methoxyethyl oleate and polyethylene glycol di-2-ethylhexoate (Flexol 4GO). Such esters may be added in amounts of 2.5 to 20 or 30 or 40 or more parts of ester by weight per 100 parts of the rubber hydrochloride. Although the addition of the ester improves the tear resistance and other properties of the film, it decreases the resistance of the film to the passage of moisture vapor. A small amount of plasticizer, such as 2.5 parts for example, has only a slight effect on the permeability of the film. In general, no wax will be employed in films containing less than 7.5 parts of plasticizer per 100 parts of rubber hydrochloride.

According to this invention the permeability of ester-plasticized rubber hydrochloride film to moisture is reduced by the addition of a wax, and because waxes are not soluble in the film in any large amount, a further ingredient is included in the film to make the wax soluble in the plasticized rubber hydrochloride. The wax and the added ingredient must both be soluble in benzene so that they will be dissolved in the benzene solution from which the film is spread. If wax is added without the ingredient which makes the wax soluble in the film composition, as the solvent evaporates from the cast film solution the wax blooms to the surface of the film and forms a visible coating on the surface.

The wax used is a hydrocarbon or ester and may be of animal, vegetable or mineral origin or produced synthetically. The preferred waxes include microcrystalline wax of petroleum origin of which there are several on the market, such as Socony Wax 2305, CO Wax Amber 150 and Ceresine Wax 101, and mineral waxes such as ozokerite and montan wax. Other waxes which have been used successfully include carnauba wax, beeswax, paraffin and stearyl hydroxystearate. The so called liquid waxes are not included in the scope of this invention, but in general any solid wax of the hydrocarbon or ester type may be employed. It is noted that the aforementioned microcrystalline waxes were formerly incorrectly considered to be amorphous. In general, the film will contain from 0.5 to 5 parts of wax per 100 parts by weight of rubber hydrochloride, or thereabouts.

The additional ingredient which renders the wax soluble in the plasticized rubber hydrochloride will be referred to herein as a compatibilizer or solubilizer of the wax. The wax is used in an amount in excess of that which is soluble in the plasticized rubber hydrochloride at room temperature and the compatibilizer brings the excess wax into homogeneous solution in the plasticized rubber hydrochloride and prevents it from forming a visible bloom on the surface of the film. A preferred compatibilizer or solubilizer is a resin formed by polymerization of coumarone, indene, or coumarone and indene. Such resins which have been used with success are Cumar CX, Cumar MH-2, Cumar P-25, Cumar MH-1, Cumar EX and Cumar RH, all manufactured by The Barrett Company. Another preferred compatibilizer is chlorinated paraffin with a chlorine content of at least 50 per cent by weight, such as Chlorowax 70 which contains 70 per cent of chlorine. Other compatibilizers which have been used with success are Amberol BS-1-LT and Amberol M-82, both rosin-modified phenol-formaldehyde resins manufactured by Rohm & Haas; cyclized rubber; polyisoprene; polybutadiene; Turgum S, refined pine gum manufactured by J. M. Huber, Inc.; Pentalyn 802-A, pentaerythritol ester of rosin manufactured by Hercules Powder Company; Flexoresin, terpene polymer manufactured by Glyco Products Company; Bakelite 10282, phenol-formaldehyde resin manufacured by Bakelite Corporation; chlorinated polyethylene; WW gum rosin; Singapore Damar No. 2 and Batavia Damar A. The amount of compatibilizer used will depend upon which compatibilizer is employed, and the wax used. Ordinarily about 10 to 25 parts will be used per each 100 parts by weight of rubber hydrochloride.

Rubber hydrochloride films are used largely for packaging foodstuffs and the wax and compatibilizer therefore ordinarily must be non-toxic. Both must be soluble in benzene.

To illustrate the invention reference is had to seven films produced with 1 to 4 parts of various waxes, per 100 parts of rubber hydrochloride. The films contained plasticizers of different kinds and amounts. Two of the films contained Cumar P-25 as a compatibilizer and the others contained Chlorowax 70. The film compositions are given in the following table. Below this is the gauge of each film measured in hundred thousandths of an inch together with the WVTR (100° F.) for each, i. e., the water-vapor transfer rate measured in grams per 100 square inch per 24 hours at 100° F., under standard conditions of test.

*Table I*

|   | A | B | C | D | E | F | G |
|---|---|---|---|---|---|---|---|
| Rubber hydrochloride | 100 | 100 | 100 | 100 | 100 | 100 | 100 |
| Trioctyl phosphate | 17.5 |  |  |  |  |  | 17.5 |
| Methoxyethyl oleate |  |  | 7.5 | 7.5 | 7.5 | 6.25 |  |
| Dibutyl sebacate |  |  | 7.5 | 7.5 | 7.5 | 6.25 |  |
| Butyl stearate |  | 17.5 |  |  |  |  |  |
| Cumar P-25 | 10 | 10 |  |  |  |  |  |
| Chlorowax 70 |  |  | 15 | 20 | 20 | 15 | 15 |
| Socony Wax 2305 | 2 | 2 |  |  |  |  |  |
| Montan wax |  |  | 1 | 2 | 3 | 4 |  |
| Ceresine wax 101 |  |  |  |  |  |  | 1.5 |
| Gauge | 165 | 165 | 145 | 160 | 165 | 170 | 160 |
| WVTR | 1.57 | 1.88 | 0.99 | 0.45 | 0.35 | 0.38 | 0.73 |

The effect on the water-vapor transfer rate varies somewhat with different ester plasticizers, and the values obtained on different areas of the same film vary somewhat. However, in general, it may be said that for films of the ester-plasticizer content and gauge given in the following table, the water-vapor transfer rate will be about as shown.

*Table II*

| Parts Plasticizer per 100 Parts Rubber Hydrochloride | WVTR (100° F.) | |
|---|---|---|
|  | 150 ga. | 165 ga. |
| 12.5 Parts Ester Plasticizer | 1.47 | 1.34 |
| 17.5 Parts Ester Plasticizer | 3.75 | 3.40 |

The improvement in water-vapor transfer rate which results from the addition of wax is readily evident from a comparison of the rates in Table I with the known rates for films containing no wax given in Table II. The comparisons should take into account the different rates for films of different plasticizer content and different thickness. The montan wax and ceresine wax gave better moistureproofness than the Socony wax, although the latter gave considerable improvements over film containing no wax.

By the proper incorporation of wax and compatibilizer, the water-vapor transmission rate of a film can be reduced to a value 10 to 15 per cent as great as for a similar film not so compounded.

The foregoing examples are illustrative and are not to be considered as limiting the invention. Stabilizers such as light inhibitors, and coloring matter, etc., may be added to the films. They may be made of any desired thickness. They may be cast and dried in any suitable manner.

What I claim is:

Bloom-free rubber hydrochloride film which contains at least 7.5 parts of ester plasticizer per 100 parts of the rubber hydrochloride, 0.5 to 5 parts of solid wax of the class consisting of hydrocarbon waxes and ester waxes, said wax being in excess of the amount soluble in the plasticized rubber hydrochloride, and chlorinated paraffin in sufficient amount to make the wax soluble in the plasticized rubber hydrochloride; the plasticizer, wax and chlorinated paraffin being non-toxic and benzene soluble and the chlorinated paraffin having a chlorine content of at least 50 per cent by weight.

References Cited in the file of this patent

UNITED STATES PATENTS

| Number | Name | Date |
|---|---|---|
| 2,181,632 | Winkelmann | Nov. 28, 1939 |